Oct. 22, 1968  I. K. B. LASBREY ET AL  3,406,843
APPARATUS FOR CLASSIFYING ARTICLES
Filed July 18, 1966  3 Sheets-Sheet 2

INVENTORS
IAN KENNAN BERTRAM LASBREY
HARRY FITZGERALD
BY Cushman, Darby & Cushman
ATTORNEYS

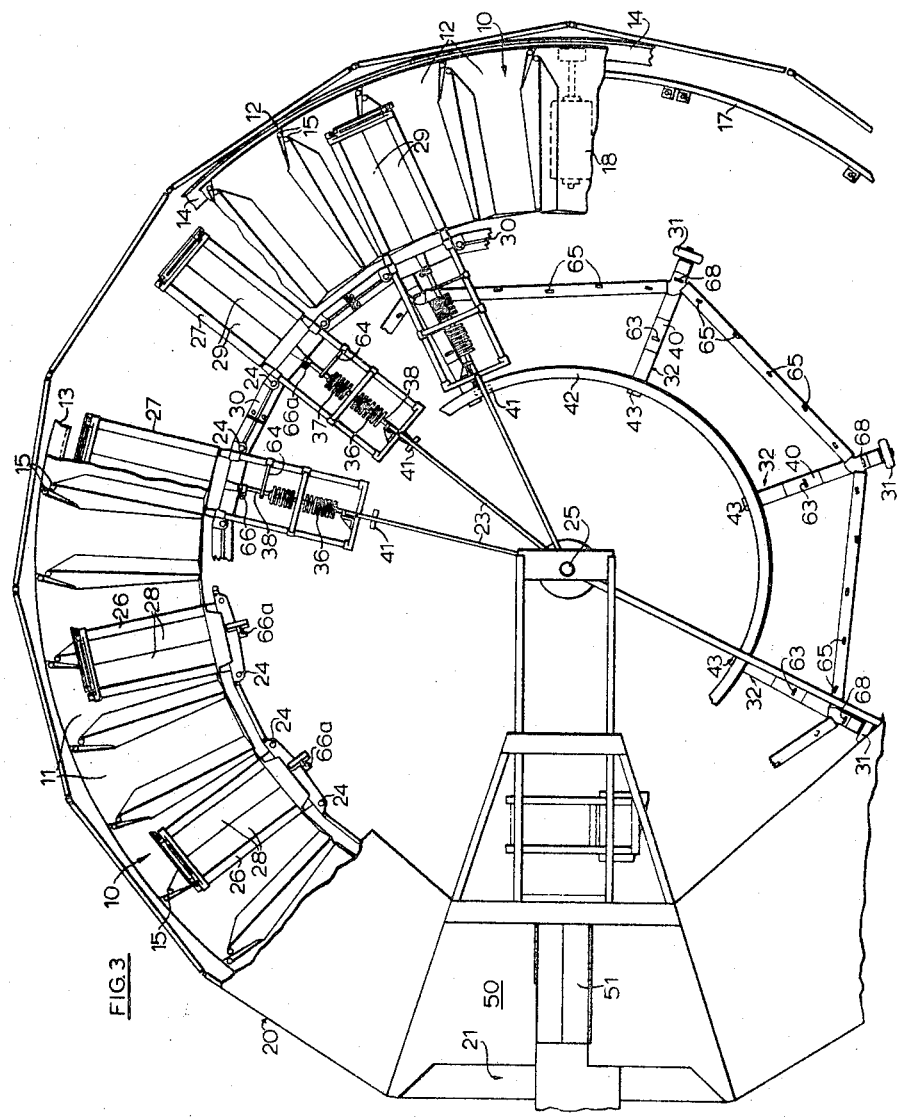

United States Patent Office
3,406,843
Patented Oct. 22, 1968

3,406,843
APPARATUS FOR CLASSIFYING ARTICLES
Ian K. B. Lasbrey and Harry Fitzgerald, Belfast, Northern Ireland, assignors to Short Brothers and Harland Limited, Belfast, Northern Ireland, a company of Northern Ireland
Filed July 18, 1966, Ser. No. 565,866
Claims priority, application Great Britain, July 23, 1965, 31,569/65
5 Claims. (Cl. 214—11)

ABSTRACT OF THE DISCLOSURE

An apparatus for classifying articles comprises a part-circular rack of open topped compartments disposed in at least two vertically-spaced tiers about a central axis and a turntable with corresponding vertically-spaced transfer elements mounted for rotation about the central axis. The apparatus is provided with a charging station for loading the vertically-spaced transfer elements of the turntable with the articles to be classified and a discharging station for unloading classified articles from the compartments. The articles to be classified are loaded into the uppermost transfer elements from which they are dispensed into a compartment of the uppermost tier or dispensed into a lower transfer element which, in turn, dispenses the articles into a compartment of a lower tier. The transfer of articles from the charging station to the transfer elements and from the transfer elements to the compartments is controlled by selector means at the charging station.

---

This invention relates to apparatus for classifying articles. It is particularly, but not exclusively, concerned with apparatus for use in laundries for sorting laundered articles into separate compartments allocated to different customers.

According to the invention, apparatus for classifying articles comprises a part-circular rack of open-topped compartments disposed in at least two vertically-spaced tiers about a central axis, a turntable mounted for rotation about said central axis and carrying at least one assembly of vertically-spaced transfer elements, each transfer element having a retractable floor and being so disposed as to pass above the compartments of a respective tier on rotation of the turntable, a charging station including a retractable loading tray, located immediately above the path of the uppermost transfer element, means for retracting the loading tray when an assembly of transfer elements passes beneath it so as to transfer an article from the loading tray by gravity to one of the transfer elements, and selector means at the charging station under the control of an operator and arranged to cause the floor of said one transfer element to be retracted when it passes above a selected compartment so as to transfer the article by gravity to said compartment, the selector means also being arranged to retract the floor of any transfer element above the transfer element appropriate to the tier containing the selected compartment when the assembly of transfer elements is in the neighborhood of the charging station.

Preferably, the part-circular rack of compartments is itself rotatable about the central axis. During the sorting of articles into the compartments, the rack is kept in a fixed position in which the charging station lies between its ends, and the turntable is rotated. When sorting has been completed, the rack is slowly rotated so as to bring each compartment in turn to a discharging station, at which an operator can withdraw the articles, e.g. for wrapping and dispatch to customers. In this respect and in certain other features, the apparatus may resemble that described in the specification of our co-pending British application No. 20,792/65.

A specific embodiment of the invention will now be described in more detail by way of example and with reference to the accompanying drawings, in which:

FIG. 3 is a plan view, with parts broken away, of the apparatus.

Figure 1:
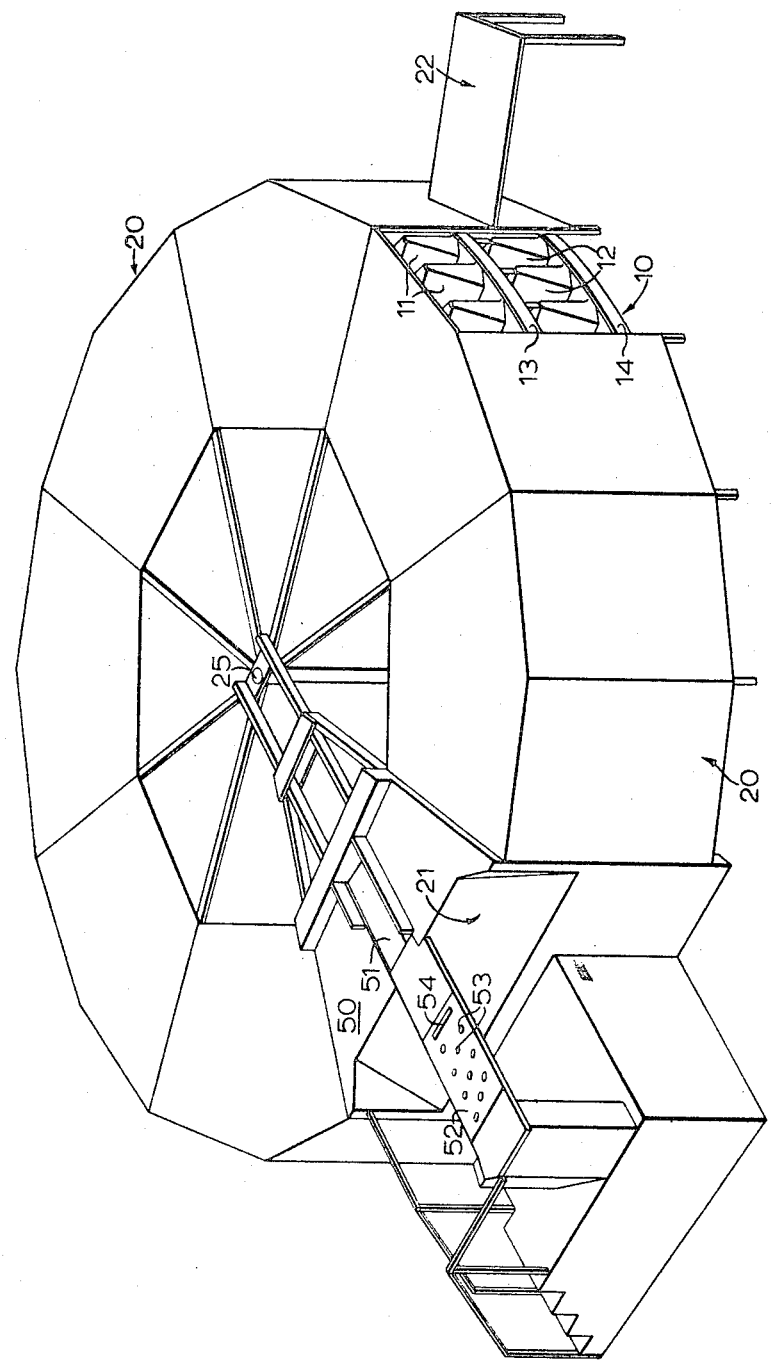
FIG. 1 is a general perspective view of an apparatus for classifying articles.

In this embodiment, the rack (generally indicated at 10) extends through a circular arc of 320°, and comprises two tiers of open-topped compartments or bins 11, 12 supported in cantilever from a circular rack-supporting frame structure disposed around the periphery of the rack 10 and comprising a pair of horizontal bin supporting rings 13, 14 joined by tubular uprights 15. Each bin 11 of the upper tier lies directly above but spaced from a corresponding bin 12 in the lower tier. The bins 11, 12 are thus in vertically-spaced pairs. The lower bin supporting ring 14 is mounted through small runner wheels 16 (FIG. 2) on a circular rail 17 whose centre lies on the central axis of the rack 10. The rack 10 can be rotated by means of a motor 18 driving a friction wheel 19 in contact with the underside of the lower pin supporting ring 14. The rack is enclosed by a fixed housing 20 incorporating a charging station 21 and discharging station 22.

A turntable, generally indicated at 23 and including a ring of tubular uprights 24, is mounted on a vertical pivot 25 coinciding with the central axis of the rack and at its periphery carries fourteen pairs of vertically-spaced transfer trays 26, 27 having pivotal trap-door type floors 28, 29 which are spring-loaded towards the open position. Only two of the pairs of trays 26, 27 appear in FIG. 2 and parts of three of the pairs in FIG. 3. A peripheral member 30 of the turntable runs on a series of supporting runner wheels 31 (FIG. 2) mounted on a fixed part 32 of the apparatus, and the turntable 23 can be rotated by a motor 33 driving a friction wheel 34 in contact with the peripheral member 30, as described in the specification of our co-pending British application No. 20,792/65.

The two transfer trays 26, 27 of each pair are mounted in cantilever on the uprights 24 of the turntable 23 so as to pass directly over the bins 11, 12 of the upper and lower tiers respectively, as the turntable 23 revolves. As more fully described in the specification of our co-pending British application No. 20,792/65, inboard of the lower transfer tray 27 is a "mechanical memory" 35 in the form of two sets of pivotal fingers 36, 37 spaced along a shaft 38 extending radially of the turntable 23. The shaft 38 is connected to a latch 39 supporting the pivotal floor 29 of the lower transfer tray 27, and, through cranks 66, 66a, a vertical link 67, and a shaft 38a, to a further latch 391 supporting the floor 28 of the upper transfer tray 26, so that rotation of the shaft 38 releases the latches and causes the floors 28, 29 to open. The fingers 36, 37 are mounted on the shaft 38 so that they can pivot through a limited angle about the shaft without rotating the shaft and releasing the latch. The fingers 36, 37 when pivoted through such a limited angle out of their normal rest position, will co-operate with detents (such as those shown at 63 and 65 in FIGS. 2 and 3) located on a fixed part 40 of the apparatus so as to rotate the shaft 38 and thereby release the latches to open the floors 28, 29 of the two transfer trays 26, 27 when they reach a particular pair of bins 11, 12.

To avoid the necessity for having a number of memory fingers 36, 37 equal to the number of pairs of bins 11, 12, the pairs of bins are preferably divided into groups and the memory fingers 36, 37 divided into different series as shown, such that a memory finger 36 of the first series selects a group of bins and half-cocks the latches 39, 391 of the transfer trays by contacting a detent 63 when that group is reached, thereby partially rotating the shaft 38 and bringing the memory fingers 37 of the second series into position to be contacted by the detents 65. The finger 37 which has been actuated thus selects a particular pair of bins within the group and completes the opening of the transfer trays by contacting the further detent 65 and releasing the latches. Thus in the rack illustrated, having 35 pairs of bins, the bins are divided into seven groups of five pairs. Seven memory fingers 36 of the first series select the group of bins while five fingers 37 of the second series select the particular pair of bins within any group of five, at which the transfer trays open. A latch 64 holds the shaft 38 in the half-cocked position after the finger 36 has contacted its detent 63, while a trip 68 releases the latch 64 after the transfer tray assembly has passed the appropriate group of bins, enabling the shaft 38 to be restored to its normal position by springs (not shown).

Figure 2:
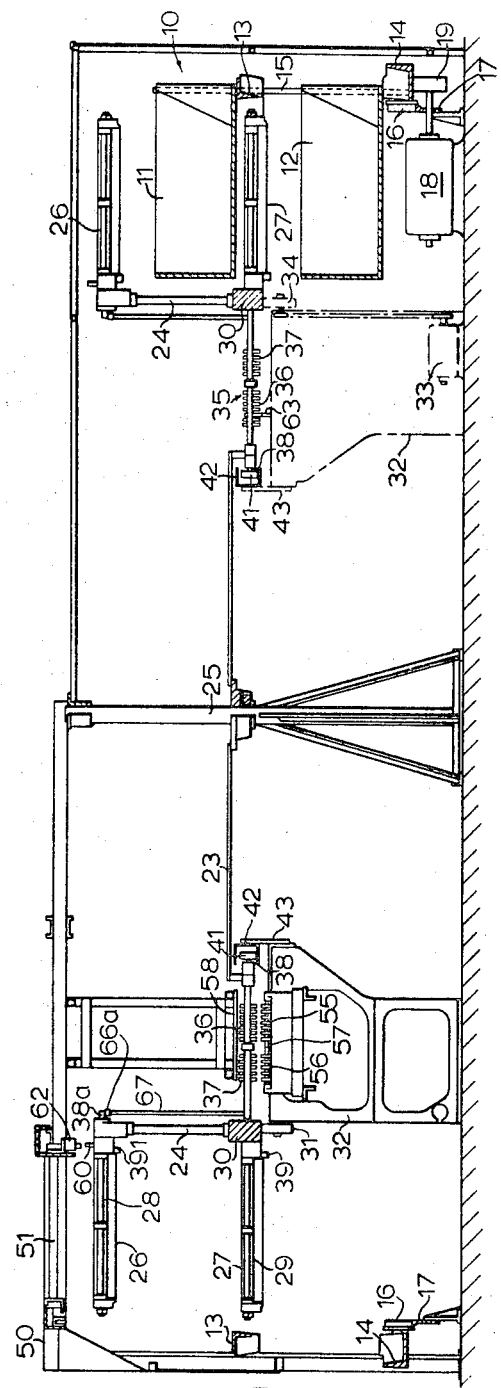
FIG. 2 is a sectional elevation.

As can be seen in FIG. 2, the inner end of the shaft 38 is provided with a freely rotatable steady roller 41, running in a guide rail 42 on a fixed part 43 of the apparatus.

The charging station 21 (FIG. 1) comprises a platform 50 incorporating a pneumatically-operated pivotal trapdoor type loading tray 51 and a manual selector 52 having ten digit keys 53 and an "Executive" key 54. The keys 53 are connected to an electronic memory. Operation of any two keys 53 will provide an "address" for directing an article into a particular bin, by causing respective solenoid-operated pneumatic jacks to actuate one finger in each of two series of memory-setting pivotal fingers 55, 56 mounted on a shaft 57 which is secured in the fixed part 32 of the apparatus just below the level of the shaft 38 carrying the mechanical memory fingers 36, 37 on the transfer tray assembly, and at or just before the charging station 21 in relation to the rotation of the turntable 23. The memory-setting fingers 55, 56 actuated by the pushbuttons 53, 54 set the mechanical memory fingers 36, 37 to open the transfer tray floors 28, 29 when the transfer trays 26, 27 reach a selected pair of bins 11, 12. Before the memory-setting fingers 55, 56 in the direction of rotation of the turntable is a re-setting mechanism 58 which both resets the memory fingers 36, 37 to their rest position (as shown in FIG. 2) and closes the floors 28, 29 of the transfer trays, 26, 27 when they come round again to the charging station 21. The arrangement is similar to that more fully described in the specification of our co-pending British application No. 20,792/65.

The upper transfer tray 26 carries a projecting trip 60 and one extra solenoid-operated valve is provided which, if the address is an even number, operates an actuator 62 which then projects into the path of the trip 60, so as to cause the floor 28 of the upper transfer tray 26 to be opened shortly after it has passed the charging station 21. An electrical trip mechanism connected to the opening circuit of the loading tray 51 is actuated by the transfer tray assembly (26, 27, 35) so as to open the loading tray 51 as the said assembly approaches it, provided that the executive key 54 has been operated.

In operation, to begin with the rack 10 is stationary in a predetermined fixed position such that the charging station 21 lies between the two ends of the rack 10, and the turntable 23 is rotated.

In the sorting or classifying process, the operator first identifies an article and then presses the corresponding pair of keys 53 to select the appropriate bin 11, 12 to which it should be transferred, and places the article on the loading tray 51. When the article has been so placed the operator presses the "executive" switch 54 which energises the loading tray opening circuit so that when the next transfer tray assembly approaches the charging station 21 it causes the loading tray 51 to open at the correct instant so that the article, falling under the effect of gravity, lands squarely on the top transfer tray 26 of that transfer assembly as it passes beneath the loading tray 5.

At the same time as the loading tray 51, opens, the selected "address" or destination for the article is transferred to the memory-setting fingers 55, 56 by actuating the fingers 55, 56 corresponding to the appropriate pair of bins 11, 12. In addition, should the destination be one of the lower tier of bins 12, the actuator 62 for opening the floor 28 of the upper transfer tray 26 is operated.

As the transfer assembly rotates past the charging station 21 the selected destination is transferred mechanically from the memory-setting fingers 55, 56 to the mechanical memory fingers 36, 37 on that transfer tray assembly, by rotating the memory fingers 36,37 appropriate to the selected pair of bins 11, 12 to a position in which they will be contacted by the appropriate fixed detents such as 63, 65.

Should the article be destined for a lower tier bin 12, the article having arrived on the top transfer tray 26 will dwell there sufficiently to ensure that it has picked up the same peripheral velocity as the transfer assembly, then as the transfer assembly passes under the actuator 62 the floor 28 of the top transfer tray 26 will be opened and the article allowed to fall freely under gravity to the lower transfer tray 27 of the pair. This transfer to the lower tray 27 takes place before the transfer assembly reaches the first pair of bins 11, 12 after the charging station.

When the transfer assembly has rotated beyond the charging station 21 sufficiently for the above mentioned transfers of article and destination memory to occur, the transfer assembly will operate a switch to close the loading tray floor 51 and reset the memory-setting fingers 55, 56 and the level actuator 62 (if operated) so that the charging station 21 is made ready to receive the next article while the previous article is being transferred to its destination.

When the transfer assembly reaches the pair of bins 11, 12 which includes the selected bin, the floors 28, 29 of the two transfer trays 26, 27 are opened, or the floor 29 of the lower tray 27 opens if the upper one was opened after the charging station, and the article drops freely under gravity into the selected bin 11 or 12.

As this transfer assembly again approaches the charging station 21, the re-setting mechanism 58 resets the mechanical memory fingers 36, 37 and closes the transfer tray floors 28, 29. The transfer assembly is then ready to receive another article for classification.

When the classification of a batch of articles has been completed, the turntable 23 is stopped and the motor 18 which revolves the rack 10 slowly is started. An operator at the discharging station 22 withdraws the articles from the bins 11, 12 as they are brought to this station, for wrapping and dispatch or other treatment.

What is claimed is:

1. Apparatus for classifying articles comprising a part-circular rack of open-topped compartments disposed in at least two vertically-spaced tiers about a central axis, a turntable mounted for rotation about said central axis and carrying at least one assembly of vertically-spaced transfer elements, each transfer element having a retractable floor and being so disposed as to pass above the compartments of a respective tier on rotation of the turntable, a charging station including a retractable loading tray, located immediately above the path of the uppermost transfer element, means for retracting the loading tray when an assembly of transfer elements passes beneath it so as to transfer an article from the loading tray by gravity to one of the transfer elements, selector means at the charging station under the control of the operator for selecting the compartment to which the article is to be delivered, means controlled by said selector means for retracting the floor of any transfer element above the transfer element appropriate to the tier containing the selected compartment when the transfer element assembly passes beneath the loading tray, two series of memory-setting pivotal fingers actuated by said selector means, two series of mechanical memory pivotal fingers mounted upon the transfer element assembly and arranged to be actuated by said memory-setting fingers, fixed detents disposed adjacent the turntable and adapted arranged to be actuated by said memory-setting fingers, to select a group of compartments and further fixed detents disposed adjacent each vertical stack of compartments and adapted to co-operate with one of the second series of memory fingers so as to cause the floor of the transfer element carrying the article to be retracted as it passes above the selected compartment, so as to transfer the article by gravity to said compartment.

2. Apparatus according to claim 1, wherein the means adapted to retract the floor of any transfer element above the appropriate transfer element comprises an actuator adapted to engage a trip on the transfer element above the appropriate transfer element.

3. Apparatus according to claim 1, wherein the means adapted to retract the floor of any transfer element above the appropriate transfer element comprises actuator means adapted to engage trip means on each transfer element above the appropriate transfer element.

4. Apparatus for classifying articles comprising a part-circular rack of open-topped compartments disposed in at least two vertically-spaced tiers about a central axis, a turntable mounted for rotation about said central axis and carrying at least one assembly of vertically-spaced transfer elements, each transfer element having a retractable floor and being so disposed as to pass above the compartments of a respective tier on rotation of the turntable, a charging station including a rectractable loading tray located immediately above the path of the uppermost transfer element, means for retracting the loading tray when an assembly of transfer elements passes beneath it so as to transfer an article from the loading tray by gravity to one of the transfer elements, selector means at the charging station under the control of the operator for selecting the compartment to which the article is to be delivered, means controlled by said selector means for retracting the floor of any transfer elements above the transfer element appropriate to the tier containing the selected compartment when the transfer element assembly passes beneath the loading tray, and trip means actuated by said selector means to cause retraction of the floor of the transfer element carrying the article, as the said transfer element passes above the selected compartment, so as to transfer the article by gravity to said compartment.

5. Apparatus for classifying articles comprising a part-circular rack of open-topped compartments disposed in at least two vertically-spaced tiers about a central axis, a turntable mounted for rotation about said central axis and carrying at least one assembly of vertically-spaced transfer elements, each transfer element having a retractable floor and being so disposed as to pass above the compartments of a respective tier on rotation of the turntable, a charging station including a retractable loading tray located immediately above the path of the uppermost transfer element, means for retracting the loading tray when an assembly of transfer elements passes beneath it so as to transfer an article from the loading tray by gravity to one of the transfer elements, selector means at the charging station under the control of the operator for selecting the compartment to which the article is to be delivered, means controlled by said selector means for retracting the floor of any transfer elements above the transfer element appropriate to the tier containing the selected compartment when the transfer element assembly passes beneath the loading tray, mechanical memory pivotal fingers actuated by said selector means, and fixed detents disposed adjacent the compartments and adapted to co-operate with said mechanical memory fingers so as to cause the floor of the transfer element carrying the article to be retracted as it passes above the selected compartment, so as to transfer the article by gravity to said compartment.

References Cited

UNITED STATES PATENTS 2,589,561    3/1952    Mackechnie _____ 214—11

M. HENSON WOOD, JR., *Primary Examiner.*

R. A. SCHACHER, *Assistant Examiner.*